United States Patent [19]

Burns et al.

[11] Patent Number: 5,082,872

[45] Date of Patent: Jan. 21, 1992

[54] INFUSIBLE PRECERAMIC POLYMERS VIA ULTRAVIOLET TREATMENT IN THE PRESENCE OF A REACTIVE GAS

[75] Inventors: Gary T. Burns, Midland, Mich.; Leslie D. Fontaine, Blue Springs, Mo.; Ronald S. Reaoch, Elizabethtown, Ky.

[73] Assignee: Dow Corning Corporation, Midland, Mich.

[21] Appl. No.: 119,599

[22] Filed: Nov. 12, 1987

[51] Int. Cl.⁵ ............................. C08K 1/00; C08J 3/28
[52] U.S. Cl. ............................ 522/77; 522/79; 522/81; 522/84; 522/114; 522/120; 522/132; 522/141; 522/145; 522/146; 522/172
[58] Field of Search ............. 522/77, 79, 81, 84, 522/114, 120, 129, 132, 134, 135, 141, 145, 146, 162, 172

[56] References Cited

U.S. PATENT DOCUMENTS

| | | | |
|---|---|---|---|
| 4,446,169 | 5/1984 | Castle et al. | 528/12 |
| 4,464,460 | 8/1984 | Hiraoka et al. | 156/659.1 |
| 4,544,729 | 10/1985 | Nate et al. | 430/272 |
| 4,546,163 | 10/1985 | Haluska | 524/14 |
| 4,569,953 | 2/1986 | West et al. | 526/194 |
| 4,587,205 | 5/1986 | Harrah et al. | 430/326 |
| 4,588,801 | 5/1986 | Harrah et al. | 528/25 |
| 4,602,050 | 7/1986 | West et al. | 522/135 |

*Primary Examiner*—Peter A. Nelson
*Attorney, Agent, or Firm*—James E. Bittell

[57] ABSTRACT

A method is disclosed for the preparation of ceramic materials or articles by the pyrolysis of preceramic polysilanes wherein the preceramic polysilanes are rendered infusible prior to pyrolysis by exposure to ultraviolet irradiation in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane. This method is especially suited for the preparation of ceramic fibers. The ceramic fiber's surface properties can be modified by the practice of this invention; for example, a ceramic fiber with a carbon rich surface layer can be obtained when 1,3-butadiene is used as the reactive gas.

31 Claims, No Drawings

INFUSIBLE PRECERAMIC POLYMERS VIA ULTRAVIOLET TREATMENT IN THE PRESENCE OF A REACTIVE GAS

STATEMENT OF GOVERNMENT RIGHTS

The United States Government has rights in this invention pursuant to Contract Number F33615-83-C-5006 awarded by the U.S. Air Force.

BACKGROUND OF INVENTION

This invention relates to the preparation of ceramic materials or articles by the pyrolysis of preceramic polysilanes wherein the preceramic polysilanes are rendered infusible prior to pyrolysis by exposure to ultraviolet irradiation in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane. This method is especially suited for the preparation of ceramic fibers. The process of this invention can produce ceramic fibers with modified surface properties.

Ceramic materials have been prepared by the pyrolysis of various preceramic polymers in the prior art. Baney et al. in U.S. Pat. No. 4,310,651 (issued Jan. 12, 1982) disclosed a polysilane of general formula $[CH_3Si][(CH_3)_2Si]$ where there was present 0 to 60 mole percent $[(CH_3)_2Si]$ units and 40 to 100 mole percent $[CH_3Si]$ units and where the remaining bonds on silicon were attached to other silicon atoms and chlorine atoms or bromine atoms. The polysilane was converted to a beta-silicon carbide containing ceramic at elevated temperatures (about 1400° C.) without any separate step to render the polysilane infusible prior to pyrolysis.

Baney et al. in U.S. Pat. No. 4,298,559 (issued Nov. 3, 1981) prepared polysilanes of general formula $[CH_3Si][(CH_3)_2Si]$ where there was present 0 to 60 mole percent $[(CH_3)_2Si]$ units and 40 to 100 mole percent $[CH_3Si]$ units and where the remaining bonds on silicon were attached to other silicon atoms and additional alkyl radicals of 1 to 4 carbon atoms or phenyl radicals. Upon heating these polysilanes were converted into silicon carbide containing ceramics in high yields. No method was disclosed whereby the polysilane could be rendered infusible prior to pyrolysis.

Baney et al. in U.S. Pat. No. Re. 31,447 (reissued Nov. 22, 1983) disclosed polysilanes of the general formula $[CH_3Si][(CH_3)_2Si]$ where there was present 0 to 60 mole percent $[(CH_3)_2Si]$ units and 40 to 100 mole percent $[CH_3Si]$ units and where the remaining bonds on silicon were attached to other silicon atoms and alkoxy radicals containing 1 to 4 carbon atoms or phenoxy radicals. Silicon carbide ceramics were obtained by firing these polysilanes to elevated temperatures. Again, no method for rendering the polysilane infusible was disclosed.

Baney et al. in U.S. Pat. No. 4,314,956 (issued Feb. 9, 1982) disclosed polysilanes of the general formula $[CH_3Si][(CH_3)_2Si]$ where there was present 0 to 60 mole percent $[(CH_3)_2Si]$ units and 40 to 100 mole percent $[CH_3Si]$ units and where the remaining bonds on silicon were attached to silicon and amine radicals of the general formula $-NHR^{iv}$ where $R^{iv}$ is a hydrogen atom, an alkyl radical of 1 to 4 carbon atoms or a phenyl radical. A silicon carbide ceramic was obtained by firing this polysilane to an elevated temperature under an inert atmosphere without a separate step to render the polysilane infusible.

The polysilanes of U.S. Pat. Nos. 4,310,651, 4,298,599, Re 31,447, and 4,314,956 are further discussed in Baney et al. *Organometallics*, 2, 859 (1983).

West in U.S. Pat. No. 4,260,780 (issued Apr. 7, 1981) prepared a polysilane of general formula $[(CH_3)_2Si][CH_3(C_6H_5)Si]$ by the sodium metal reduction of dimethyldichlorosilane and methylphenyldichlorosilane. The resulting polysilanes had very high softening points (>280° C.). No infusibilty step was disclosed.

West et al. in *Polym. Prepr.*, 25, 4 (1984) disclosed the preparation of a polysilane of general formula $[CH_3(CH_2=CHCH_2)Si][CH_3(C_6H_5)Si]$ by the sodium metal reduction of allylmethyldichlorosilane and methylphenyldichlorosilane. These polysilanes were rapidly gelled with ultraviolet irradiation.

Seyferth et al. in U.S. Pat. No. 4,639,501 (issued Jan. 27, 1987) prepared preceramic polymers by reacting a methylpolysilane of the general formula $[(RSiH)_x(RSi)_y]_n$ with an organosilicon compound having at least two vinyl groups of the general formula $[R_2(CH_2=CH)Si]_2Y$, where, for example, Y is O, S, NH, NR, or is absent, using either UV irradiation, thermal energy, or catalysts. No procedure was given for rendering the preceramic polymer infusible prior to pyrolysis.

Gaul in U.S. Pat. No. 4,312,970 (issued Jan. 26, 1982) obtained ceramic materials by the pyrolysis of preceramic silazane polymers prepared by reacting organochlorosilanes and disilazanes. The preceramic silazane polymers were pyrolyzed in an inert atmosphere without any separate treatment to render the silazane preceramic polymer infusible.

Gaul in U.S. Pat. No. 4,340,619 (issued July 20, 1982) obtained ceramic materials by the pyrolysis of preceramic silazane polymers prepared by reacting chlorine-containing disilanes and disilazanes. Fibers prepared from such preceramic silazane polymers were given a "mild heat treatment" in air before pyrolysis but there is no teaching that such a treatment rendered the fibers infusible.

Cannady in U.S. Pat. No. 4,540,803 (issued Sept. 10, 1985) obtained ceramic materials by the pyrolysis of preceramic silazane polymers prepared by reacting trichlorosilane and disilazane. The preceramic silazane polymers were not rendered infusible prior to pyrolysis to form ceramic materials.

Bartos et al. in U.S. patent application Ser. No. 748,109, filed June 24, 1985, and now abandoned obtained infusible preceramic silazane polymers by treatment of the preceramic silazane polymer with a steam or a steam and oxygen mixture.

Lu in a copending U.S. patent application Ser. No. 69,565, filed July 6, 1987, and now U.S. Pat. No. 4,847,027, entitled "Infusible Preceramic Polymers via Nitric Oxide Treatment" describes the preparation of ceramic materials or articles by the pyrolysis of preceramic polymers wherein the preceramic polymers are rendered infusible prior to pyrolysis by exposure to gaseous nitric oxide. The preceramic polymers include polycarbosilanes, polysilazanes, and hydridopolysilazanes.

Lipowitz, in U.S. patent application Ser. No. 926,168, filed Nov. 3, 1986, now U.S. Pat. No. 4,743,662 obtained infusible preceramic polymer by treatment of the preceramic polymer with a plasma energy source. Both vinyl-containing and vinyl-free preceramic polymers were rendered infusible by plasma treatment. High energy electrons interact with neutral gas molecules in the plasma thereby forming unique species such as metastable species, atoms, radicals, and ions. Theses unique species then interact with the preceramic polymer thereby rendering the preceramic polymer infusible.

Lutz et al., in U.S. patent application Ser. No. 905,020, filed Sept. 8, 1986, now U.S. Pat. No. 4,816,497, obtained infusible preceramic polymer compositions by treatment of the compositions with UV irradiation wherein the compositions contained vinyl- or allyl-containing preceramic polymers, mercapto compounds, and photoinitiators.

Bujalski et al., in copending U.S. patent applications Ser. No. 94,347, filed Sept. 8, 1987, and now U.S. Pat. No. 4,889,899, entitled "A Method of Producing Silicon Carbide Preceramic Vinyl-containing Polymers" and Ser. No. 94,434, filed Sept. 4, 1987, now U.S. Pat. No. Des. 321,091, and entitled "An Improved Method of Producing Silicon Carbide Preceramic Vinyl-containing Polymers," obtained infusible preceramic polymers by thermal treatment of vinyl-containing polysilanes or by UV irradiation of vinyl-containing polysilanes.

Yajima et al. in U.S. Pat. Nos. 4,220,600 (issued Sept. 2, 1980), 4,283,376 (issued Aug. 11, 1981), 4,342,712 (issued Aug. 3, 1982), and 4,399,232 (issued Aug. 16, 1983) disclosed the use of gamma ray or electron beam irradiation to cure preceramic modified polycarbosilane fibers prior to pyrolysis.

What has been newly discovered is a method of rendering preceramic polysilanes infusible prior to pyrolysis by ultraviolet irradiation of the preceramic polysilanes in the presence of a reactive gas. This method represents a significant advance in the art of preparing ceramic materials or articles, especially in the art of preparing ceramic fibers.

THE INVENTION

This invention relates to a method of rendering a preceramic polysilane infusible prior to pyrolysis, which method comprises ultraviolet irradiation of the preceramic polysilane in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane for a time sufficient to render the preceramic polysilane infusible.

This invention also relates to a method of preparing a ceramic article, said method comprising (A) forming an article of the desired shape from a preceramic polysilane; (B) curing the article formed in step (A) by ultraviolet irradiation of the formed article in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane so that the formed article will not melt or fuse during pyrolysis step (C); and (C) heating the cured article of step (B) in an inert atmosphere or in a vacuum to an elevated temperature greater than 800° C. until the preceramic polysilane is converted to ceramic article.

Exposure of the preceramic polysilane compositions of the present invention to ultraviolet irradiation in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane will result in an infusible preceramic polysilane material suitable for pyrolysis to form a ceramic material. Preceramic polysilane compositions in the form of pellets, powders, flakes, foams, fibers, and the like are especially suitable for treatment by the method of this invention. Preceramic polysilane compositions in the form of fibers are especially preferred in the practice of this invention.

Suitable reactive gases include ethylene, 1,3-butadiene, 2-methyl-1,3-butadiene, 1,4-pentadiene, silane, chlorosilane, dichlorosilane, boron trichloride, oxygen and water mixture, acetylene, tetravinylsilane, and the like. Moist air can be used as the oxygen and water mixture. The reactive gas should have a fairly high vapor pressure at the treatment temperature to provide for a sufficient gas concentration at the surface of the preceramic polysilane article so that the cure can proceed at a reasonable rate. It is also desirable that the reactive gas does not itself decompose or polymerize due to the ultraviolet irradiation. It is also desirable that the preceramic polysilane not be solublized by the reactive gas; otherwise the preceramic polysilane article may soften or melt in the presence of sufficient concentrations of the reactive gas.

Preferred reactive gases include ethylene, 1,3-butadiene, 2-methyl-1,3-butadiene, and 1,4-pentadiene. 1,3-Butadiene is especially preferred. By use of these reactive gases a carbon rich surface can be built up on the ceramic article produced after pyrolysis. By "carbon rich" we mean a condition where the molar amount of carbon present is greater than the molar amount of silicon present. Although not wishing to be limited by theory, it is though that the ultraviolet irradiation of the preceramic polysilane results in formation of reactive intermediates such as silylenes and/or free radicals on the surface of the preceramic polysilane surface. These reactive intermediates can then react with the reactive gas thereby rendering the surface infusible. When the reactive gas is ethylene, 1,3-butadiene, 2-methyl-1,3-butadiene, or 1,4-pentadiene, it is possible that the reactive gas undergoes free radical polymerization on the surface. Such polymerization would leave the surface relatively carbon-rich. Upon pyrolysis to a ceramic material, the surface remains carbon-rich. Thus, by controlling the amount of either the reactive gas available for reaction or the duration of the treatment, the surface of the ceramic article can be modified. Modification of the surface properties of ceramic fibers may be especially valuable. The use of other reactive gases may also result in modification of surface properties.

The temperature of treatment of the preceramic polysilanes with ultraviolet irradiation and reactive gas should be sufficiently low so that the preceramic polysilane composition does not melt or fuse during the treatment step. Preferably the treatment temperature is between room temperature and the softening temperature of the preceramic polysilane. More preferably the treatment temperature should be between room temperature and about 10° C. below the softening temperature of the preceramic polysilane. As the preceramic polysilane cures the softening temperature will increase; therefore temperatures greater than the initial softening temperature may be used in the later part of the ultraviolet irradiation and reactive gas treatment step.

The preceramic polysilanes are exposed to ultraviolet irradiation in the presence of the reactive gas for a time sufficient to render the preceramic polysilane infusible. What is meant by "infusible" in this specification is that the irradiated preceramic polysilane, when heated rapidly up to the pyrolysis temperature, will not fuse together. A crude screen for infusibility is provided by the solubility of the preceramic polysilane in toluene. Prior to any curing treatment the preceramic polysilanes of this invention are completely or almost completely soluble in toluene. The infusible preceramic polysilane compositions obtained by the method of this invention are generally either insoluble in toluene or have only limited solubility in toluene. The time required to render the preceramic polysilane composition infusible by the method of this invention will depend, in part, on the size of the preceramic polysilane article, the treatment temperature, the concentration of reactive gas to which the composition is exposed, the intensity and wavelength of the ultraviolet irradiation, and the specific preceramic polysilane employed. The optimum treatment time can be determined by routine experimentation. For fibers a treatment time of about one minute to several hours is generally sufficient; longer treatment times may be used.

When the preceramic polysilane is in the shape of a formed object such as a fiber it is not necessary to render the entire shaped article infusible. Rather only the outer surfaces, and sufficient interior portions directly adjacent to the outer surfaces, need be rendered infusible. The interior portion of the shaped article may be cured during the pyrolysis of the shaped article to elevated temperature. Simply rendering the exterior infusible will prevent the shaped articles from fusing together during the pyrolysis unless a break in the exterior surface occurs which allows the uncured interior to leak out.

When the preceramic polysilane is in the shape of a formed object such as a fiber it is generally preferred that the fiber be under tension during the actual curing step. The amount of tension usually employed is that sufficient to keep the fibers from kinking during the cure step. The tendency of the fibers to kink during the curing step may also be reduced by limiting the amount of reactive gas present during the ultraviolet irradiation or limiting the duration of the ultraviolet irradiation in the presence of the reactive gas. Of course, there must be sufficient reactive gas and irradiation duration to effect the cure but excess reactive gas or irradiation duration, with the resulting build up of the reactive gas byproducts on the surface of the fiber, will result in an increased tendency to kink.

The preceramic polysilane may be exposed to either an atmosphere of the reactive gas or the reactive gas diluted in an inert gas such as nitrogen, argon, and the like. The pressure of the reactive gas may be less than, equal to, or greater than atmospheric pressure. In the case of preceramic polysilane fibers, the ultraviolet irradiation/reactive gas treatment may be carried out using a continuous, "on-line" method as the fibers are formed or a batch treatment where a bundle of fibers may be treated. Using the batch treatment method care must be taken that all the fibers are exposed to sufficient ultraviolet irradiation; in other words, excessive "shadowing" of fibers in the center of the bundle should be avoided. Other methods of treatment as well as combinations of treatment methods may be employed.

The preceramic polysilanes suitable for this invention must be capable, after being cured by exposure to the ultraviolet irradiation/reactive gas treatment, of being converted to a ceramic material by pyrolysis at elevated temperatures. It is generally preferred that the preceramic polysilane compositions used in this invention be capable of being converted to ceramic materials in at least 40 weight percent yield. The preceramic polysilanes suitable for this invention must also have a strong ultraviolet absorbtion band. It is preferred that the preceramic polysilane absorb strongly in the 200 to 420 nanometer range; this preferred range is selected based on the good availability of ultraviolet sources in this range. Mixtures of preceramic polysilanes may also be used in this invention.

The preceramic polysilanes suitable for use in this invention are generally well known in the art. The polysilanes suitable for use in this invention should contain only limited amounts of chlorine or bromine atoms attached to silicon. Suitable polysilanes include polysilanes of general formula $$[R_2Si][RSi][R'Si]$$

where there are present 0 to 40 mole percent $[R_2Si]$ units, 40 to 100 mole percent $[RSi]$ units, and 0 to 60 mole percent $[R'Si]$ units, where R is an alkyl radical containing 1 to 4 carbon atoms and R' is an alkyl radical containing at least 5 carbon atoms or a phenyl radical, and where the other bonds on silicon are attached to other silicon atoms and R'' radicals, R'''O— radicals, RO— radicals, or $R^{iv}{}_2$N— radicals, where R'' is an alkyl radical containing 1 to 20 carbon atoms, a vinyl radical, a phenyl radical, or an acetylenic radical of general formula —$(CH_2)_wC\equiv CR^{vi}$, R''' is an alkyl radical containing 1 to 4 carbon atoms or a phenyl radical, R is an alkyl radical containing 1 to 4 carbon atoms, $R^{iv}$ is hydrogen, an alkyl radical containing 1 to 4 carbon atoms, a phenyl radical or a —$SiR^{v}{}_3$ radical, $R^v$ is an alkyl radical containing 1 to 4 carbon atoms, a vinyl radical, or a phenyl radical, where w is an integer from 0 to 3, and where $R^{vi}$ is hydrogen, an alkyl radical containing 1 to 6 carbon atoms, a phenyl radical, or an —$SiR_3$ radical. Preferably these polysilanes contain from 0 to 40 mole percent $[R_2Si]$ units, 40 to 99 mole percent $[RSi]$ units, and 0 to 30 mole percent $[R''Si]$ units. Most preferably these polysilanes contain from 0 to 10 mole percent $[R_2Si]$ units, 80 to 99 mole percent $[RSi]$ units, and 0 to 20 mole percent $[R''Si]$ units. Preferably R' is an alkyl radical containing 5 to 20 carbon atoms. For purposes of this specification, the polysilanes of the above general formula are intended to include metallopolysilanes which contain significant amounts of aluminum, boron, chromium, lanthanum, molybdenum, neodymium, niobium, samarium, tantalum, titanium, tungsten, vanadium, yttrium, or zirconium. The metallopolysilanes are described in a copending U.S. patent application of Chandra et al., Ser. No. 083,119, filed Aug. 10, 1987, now U.S. Pat. No. 4,762,895, entitled "Process for the Preparation of Preceramic Metallopolysilanes and the Polymers Therefrom" which is incorporated by reference.

The polysilanes are generally prepared from chlorine- or bromine-containing polysilanes by replacing the chlorine or bromine atoms attached to silicon with radicals selected from the group consisting of $R''$ radicals, $R'''O-$ radicals, $RO-$ radicals, and $R^{iv}{}_2N-$ radicals. The starting chlorine- or bromine-containing polysilanes can be prepared from either chlorine- or bromine-containing disilanes or from mixtures of chlorine- or bromine-containing disilanes and monosilanes of general formula $R'SiX_3$ where X is chlorine or bromine using the general procedure of U.S. Pat. No. 4,310,651 which is hereby incorporated by reference.

Replacement of the chlorine or bromine atoms by $R''$ radicals is accomplished by reacting the chlorine- or bromine-containing polysilane with an organo Grignard reagent of formula $R''MgX'$ or an organo lithium compound of formula $R''Li$ at a temperature of 0° to 110° C., in a suitable solvent, and thereafter recovering the $R''$-containing polysilane where $R''$ is an alkyl radical containing 1 to 20 carbon atoms, a vinyl radical, a phenyl radical, or an acetylenic radical of general formula $-(CH_2)_wC\equiv CR^{vi}$ wherein $R^{vi}$ is hydrogen, an alkyl radical containing 1 to 6 carbon atoms, a phenyl radical, or an $-SiR_3$ radical wherein R is an alkyl radical containing 1 to 4 carbon atoms. Procedures for replacement of chlorine or bromine atoms by $R''$ radicals are detailed in U.S. Pat. No. 4,298,559, copending U.S. patent applications by Bujalski et al. Ser. No. 094,347, filed Sept. 8, 1987, now U.S. Pat. No. 4,889,899, entitled "A Method of Producing Silicon Carbide Preceramic Vinyl-containing Polymers" and Ser. No. 094,434, filed Sept. 4, 1987 and now U.S. Pat. No. Des. 321,091, entitled "An Improved Method of Producing Silicon Carbide Preceramic Vinyl-containing Polymers," and copending U.S. patent application by Chandra et al., Ser. No. 083,121, filed Aug. 10, 1987, now U.S. Pat. No. 4,806,612, entitled "Preceramic Acetylenic Polysilanes," all of which are hereby incorporated by reference.

Replacement of the chlorine or bromine atoms in a chlorine-or bromine-containing polysilane by $R'''O-$ or $RO-$ radicals is accomplished by reacting the chlorine- or bromine-containing polysilane with a reagent selected from the group consisting of (i) carbinols having the general formula $R'''OH$, (ii) alcoholates having the general formula $R'''OQ$, and (iii) alkyl orthoformates having the general formula $(RO)_3CH$ wherein $R'''$ is an alkyl radical containing 1 to 4 carbon atoms or a phenyl radical, R is an alkyl radical containing 1 to 4 carbon atoms, and Q is sodium, potassium, or lithium, at a temperature of 0° to 110° C., in a suitable solvent, and thereafter recovering the $R'''O-$ or $RO$-containing polysilane. Procedures for replacement of chlorine or bromine atoms by $R'''O-$ or $RO$-radicals are detailed in U.S. Pat. No. Re. 31,477 which is hereby incorporated by reference.

Replacement of the chlorine or bromine atoms in a chlorine-or bromine-containing polysilane by $R^{iv}{}_2N-$ radicals is accomplished by reacting the chlorine- or bromine-containing polysilane with an aminolysis reagent having the general formula $NHR^{iv}{}_2$ wherein $R^{iv}$ is hydrogen, an alkyl radical containing 1 to 4 carbon atoms, a phenyl radical, or a $-SiR^v{}_3$ radical wherein $R^v$ is an alkyl radical containing 1 to 4 carbon atoms, a vinyl radical, or a phenyl radical, at a temperature of 0° to 110° C., in a suitable solvent, and thereafter recovering the $R^{iv}{}_2N-$ containing polysilane. Procedures for replacement of chlorine or bromine atoms by $R^{iv}{}_2N-$ radicals are detailed in U.S. Pat. No. 4,314,956 which is hereby incorporated by reference.

After the preceramic polysilane composition has been rendered infusible by ultraviolet irradiation in the presence of a reactive gas, the infusible preceramic polysilane composition is fired to a temperature of at least 800° C. in an inert atmosphere or vacuum until the mixture is converted to a ceramic material. Preferably the pyrolysis temperature is from about 1000° to about 1300° C. Since the preceramic polysilane compositions of this invention have been rendered infusible prior to pyrolysis, the pyrolysis step may be carried out by quickly raising the temperature to the desired level. If the preceramic polysilane composition is of sufficient viscosity or if it possesses a sufficiently low melt temperature, it can be shaped first, then rendered infusible, and then finally pyrolyzed to give a ceramic shaped article such as a fiber. Preferably the preceramic polysilanes used in the practice of this invention have a softening temperature of about 50° to 300° C. and most preferably in the range of 70° to 200° C. Such a softening temperature allows for the formation of preceramic fibers by known spinning techniques.

So that those skilled in the art can better appreciate and understand the invention, the following examples are given. Unless otherwise indicated, all percentages are by weight. In the following examples, the analytical methods used were as follows:

The softening temperature was determined under a nitrogen atmosphere on a Thermomechanical Analyzer, Model 940, from Dupont Instruments. Thermogravimetric analyses (TGA) were carried out on an OmniTherm TGA instrument manufactured by OmniTherm Corporation, Arlington Heights, Ill.

Carbon, hydrogen, and nitrogen were determined on a C, H, N Elemental Analyzer, Model 240-XA, manufactured by Control Equipment Corporation of Lowell, Mass. Percent silicon was determined by a fusion technique which consisted of converting the silicon material to soluble forms of silicon and then analyzing the soluble material quantitatively for total silicon by atomic absorption spectrometry. Percent chlorine was determined by fusion with sodium peroxide and potentiometric titration with silver nitrate. Oxygen was determined using a Leco Oxygen Analyzer equipped with an Oxygen Determinater 316 (Model 783700) and an Electrode Furnace EF100 (Model 77600) manufactured by Leco Corporation, St. Joseph, Mich. The method includes the high temperature carbothermic reduction to CO with CO analysis by IR.

The preceramic polysilanes were fired to elevated temperature using a Lindberg furnace (Models 54434 or 54879). The physical properties of the ceramic fibers were determined using a Instron Testing Machine Model 1122 from Instron Corporation of Canton, Mass.

Unless indicated otherwise, all manipulations involved in the preparation of the preceramic polysilanes were carried out in dry glassware under an argon atmosphere. The methylchlorodisilane mixture used throughout the examples was redistilled direct process residue which contained about 40 weight percent CH$_3$Cl$_2$SiSiCl$_2$CH$_3$, 42 weight percent (CH$_3$)$_2$ClSiSiCl$_2$CH$_3$, and 12 weight percent (CH$_3$)$_2$ClSiSiCl (CH$_3$)$_2$. Reagent grade toluene, from Fisher Scientific, was dried over molecular sieves. Tetra-n-butylphosphonium bromide was from Aldrich Chemical Company; n-ocytyltrichlorosilane was from Petrarch Systems Inc. Filtrations were done using a one-liter stainless steel pressure filter with a PTFE membrane from Gelman Science Inc. The preceramic polysilanes were generally stored in a dry box equipped with oxygen and moisture scrubbers (typical oxygen and moisture levels were both below 3 ppm) prior to use. The dry box was from Vacuum Atmosphere Co. of Hawthorne, Calif. Unless indicated otherwise, all percentages given in the examples are by weight.

In order to prepare fibers, the preceramic polysilanes was first powdered using a mortar and pestle, then melted, and then extruded through a 20 micron orifice in the center of a stainless steel spinerette using nitrogen pressure. The spun fibers were collected on a take up reel. The entire spinning operation was carried out in a plexiglass enclosure continuously purged with an inert gas.

Fibers were irradiated with either a RPR 100 Rayonet Ultraviolet Reactor equipped with 16 lamps emitting at 254, 300, or 350 nm manufactured by Southern New England Ultraviolet Company or a Porta-Cure 1500 F. high intensity medium pressure mercury UV lamp emitting at about 229 to 420 nm manufactured by American Ultraviolet Company. Unless indicated otherwise, the Rayonet system was used in the following examples.

EXAMPLE 1

A one-liter round bottom flask was charged with a mixture of methylchlorodisilanes (436 g, about 2 moles), phenyltrichlorosilane (63.4 g, 0.3 moles), and tetra-n-butylphosphonium bromide (4.4 g). The reaction mixture was heated from room temperature to 150° C. at 2° C./min, held at 150° C. for 30 minutes, heated from 150° to 270° C. at 5° C./min, and held at 270° C. for 30 minutes while removing volatile by-products (total of about 420 g) by distillation. The reaction product, a chlorine-containing polysilane, was cooled to room temperature and dissolved in 200 ml toluene. To this toluene solution was added methyllithium (0.42 moles, 266 ml of a 1.6M diethylether solution) over a five minute period; the temperature increased to about 55° C. After cooling to room temperature, and additional 100 ml toluene was added, followed by a saturated, aqueous NH$_4$Cl solution (30 g), and then additional water (90 g). The organic layer was collected and dried over anhydrous MgSO$_4$. After filtration, the solvent was removed at 300° C. and 40 mm Hg to give a yellow, methyl radical-containing polysilane (67.5 g). The Si-CH$_3$ to Si—C$_6$H$_5$ ratio was 5.5 to 1.0 as determined by proton NMR. The softening temperature was 122° C.

Fibers were prepared by melt spinning the polysilane at 217° C. and a nitrogen pressure of 100 psi. The average diameter of the fibers was 25.3 microns.

In the nitrogen-containing dry box, about 0.15 g of green fibers were loaded into a quartz tube which was then attached to a vacuum line. After evacuation, the sample tube was backfilled with 380 torr of 1,3-butadiene. The fibers in the presence of the 1,3-butadiene was then cured with 350 nm radiation for 15 hours. After curing the fibers were insoluble in toluene. The cured fibers survived intact upon pyrolysis to 1200° C. at 3° C./min under an argon atmosphere; the resulting ceramic fibers (50.2 weight percent yield) contained 48.0 weight percent carbon and 2.7 weight percent oxygen.

Another fiber sample was irradiated in the presence of 1,3-butadiene in the same manner except the 1,3-butadiene pressure was increased to 500 torr and the irradiation time was reduced to 20 minutes. After curing the fibers were insoluble in toluene. The cured fibers survived intact upon pyrolysis to 1200° C. at 3° C./min under an argon atmosphere; the resulting ceramic fibers contained 43.4 weight percent carbon and 6.1 weight percent oxygen.

For comparison purposes, additional fibers were treated in exactly the same manner except that there was no reactive gas present during the irradiation; the fibers were irradiated under high vacuum conditions. The resulting irradiated fibers were not rendered infusible; these fibers remained soluble in toluene and melted during pyrolysis to 1200° C. The resulting ceramic mass (40.4 weight percent yield) contained 39.1 weight percent carbon and 2.7 weight percent oxygen.

EXAMPLE 2

Fibers prepared as in Example 1 were irradiated in the presence of a mixture of oxygen and moisture. The fibers (about 0.15 g) were mounted across windows cut in a cardboard form. The fibers were irradiated through the windows. Prior to mounting, the cardboard form was exposed to normal room atmospheric conditions. The mounted fibers were placed in a quartz tube, evacuated, and then sealed. During irradiation, outgassing from the cardboard form provided the oxygen and moisture mixture necessary for cure.

One set of fibers was cured with 254 nm radiation for 19 hours in the presence of oxygen and moisture. After curing the fibers were insoluble in toluene. The cured fibers survived intact upon pyrolysis to 1200° C. at 3° C./min under an argon atmosphere; the resulting ceramic fibers (71.9 weight percent yield) contained 15.8 weight percent oxygen. The ceramic fibers had a tensile strength of 78 Ksi and a modulus of 16.5 Msi. As demonstrated in Example 1, fibers irradiated without the presence of a reactive gas are not rendered infusible.

EXAMPLE 3

Fibers prepared as in Example 1 were irradiated in the presence of dichlorosilane (120 torr) at 350 nm for 15 hours using the procedure of Example 1. After curing the fibers were insoluble in toluene indicating that they had been rendered infusible.

EXAMPLE 4

A polysilane was prepared in a manner similar to Example 1 except that the initial reactants included a mixture of methylchlorodisilanes (436 g, about 2 moles), phenyltrichlorosilane (21.5 g, 0.1 moles), and tetra-n-butylphosphonium bromide (4.4 g) and that the chlorine-containing polysilane was reacted with methyllithium (0.41 moles, 291 ml of a 1.4M diethylether solution). A yellow-brown, methyl radical-containing polysilane (53.4 g) was obtained. The polysilane contained 47.1 weight percent silicon and had a softening temperature of 127° C.

Fibers were prepared by melt spinning the polysilane at 201° C. and a nitrogen pressure of 50 psi. The average diameter of the fibers was 30 microns.

Fibers were cured using 350 nm irradiation for 15 hours in the presence of 1,3-butadiene (100 torr) as described in Example 1. After curing the fibers were insoluble in toluene. The cured fibers survived intact upon pyrolysis to 1200° C. at 3° C./min under an argon atmosphere; the resulting ceramic fibers (65.0 weight percent yield) contained 34.3 weight percent carbon and 10.2 weight percent oxygen. The ceramic fibers had a tensile strength of 35 Ksi and a modulus of 4.3 Msi.

EXAMPLE 5

Fibers prepared as in Example 4 were irradiated in the presence of a mixture of oxygen and moisture using the irradiation procedure of Example 2. The irradiation used was 350 nm and the irradiation duration was five hours. After curing the fibers were insoluble in toluene. The cured fibers survived intact upon pyrolysis to 1200° C. at 3° C./min under an argon atmosphere; the resulting ceramic fibers (47.2 weight percent yield) contained 16.1 weight percent oxygen.

EXAMPLE 6

A polysilane was prepared in a manner similar to Example 1 except that the initial reactants included a mixture of methylchlorodisilanes (438 g, about 2 moles), phenyltrichlorosilane (10.8 g, 0.05 moles), and tetra-n-butylphosphonium bromide (4.8 g) and that the chlorine-containing polysilane was reacted with methyllithium (0.50 moles, 311 ml of a 1.6M diethylether solution). A yellow-brown, methyl radical-containing polysilane (53.1 g) was obtained. The polysilane contained 47.1 weight percent silicon, 34.3 weight percent carbon, 7.3 weight percent hydrogen, 0.8 weight percent oxygen, and 0.3 weight percent chlorine and had a softening temperature of 136° C. The molecular weights were 642 (number average) and 1018 (weight average).

Fibers were prepared by melt spinning the polysilane at 225° to 231° C. and a nitrogen pressure of 80 psi. The average diameter of the fibers was 19.2 microns.

One set of fibers was cured using 350 nm irradiation for 2 hours in the presence of 1,3-butadiene (86 torr) as described in Example 1. After curing the fibers were insoluble in toluene. The cured fibers survived intact upon pyrolysis to 1200° C. at 3° C./min under an argon atmosphere; the resulting ceramic fibers (54.9 weight percent yield) contained 31.9 weight percent carbon and 6.2 weight percent oxygen.

Another set of fibers was cured using 350 nm irradiation for 2 hours in the presence of 1,3-butadiene (500 torr) as described in Example 1. At the end of photolysis, the reaction had consumed 133 torr of 1,3-butadiene (0.008 moles based on a reactor volume of 187 ml); the weight of the fibers increased about 38 weight percent. After curing the fibers were slightly golden in color, kinky, and insoluble in toluene. The cured fibers survived intact upon pyrolysis to 1200° C. at 3° C./min under an argon atmosphere; the resulting ceramic fibers (43.3 weight percent yield) contained 40.0 weight percent carbon, 2.45 weight percent oxygen, and 0.13 weight percent hydrogen. The carbon content of the ceramic increased about 48 weight percent relative to a ceramic material produced in a similar manner but without the 1,3-butadiene treatment.

Another set of fibers was cured using 350 nm irradiation for 20 minutes in the presence of 1,3-butadiene (500 torr) as described in Example 1. The cured fibers were insoluble in toluene indicating that they had been rendered infusible.

Still another set of fibers was cured using 228 to 420 nm irradiation using the Porta-Cure system. The fibers were irradiated for five minutes; the temperature was 185° C. at the end of the irradiation. At the end of photolysis, the reaction had consumed about 0.0059 moles of 1,3-butadiene. After curing the fibers were white, kinky, and insoluble in toluene. The cured fibers survived intact upon pyrolysis to 1200° C. at 3° C./min under an argon atmosphere; the resulting ceramic fibers (53.2 weight percent yield) contained 34.1 weight percent carbon, 7.3 weight percent oxygen, and 0.10 weight percent hydrogen. The carbon content of the ceramic increased about 24 weight percent relative to a ceramic material produced in a similar manner but without the 1,3-butadiene treatment.

EXAMPLE 7

Fibers prepared as in Example 6 were irradiated in the presence of ethylene (500 torr) at 350 nm for 2 hours using the procedure of Example 1. After curing the fibers were only partially soluble in toluene. However, the cured fibers survived intact upon pyrolysis to 1200° C. at 3° C./min under an argon atmosphere indicating that the ethylene treatment had rendered the fibers infusible; the resulting ceramic fibers (62.9 weight percent yield) contained 28.0 weight percent carbon and 15.5 weight percent oxygen.

EXAMPLE 8

A chlorine-containing polysilane was prepared by reacting a mixture of methylchlorodisilanes (1183 g, about 5 moles), n-octyltrichlorosilane (67 g, 0.3 moles), and tetra-n-butylphosphonium bromide (12.5 g) by heating from room temperature to 90° C. at 5° C./min, from 90° to 108° C. at 2° C./min, holding at 108 ° C. for 15 minutes, and heating from 108° to 250 ° C. at 1.5° C./min while removing volatile by-products. The chlorine-containing polysilane (81.5 g), dissolved in about 300 ml of xylene and cooled to 0° C., was added dropwise to a solution of ($CH_2$=CH)MgBr (0.26 moles) and $CH_3MgCl$ (0.26 moles). The temperature was increased to 100° C. and held for 40 minutes. After cooling to room temperature, aqueous $NH_4Cl$ was added. The organic layer was dried, filtered, and then the solvent was removed at 220° C. and 20 mm Hg. Treatment of the vinyl- and methyl-containing polysilane above about 200° C. was kept to a minimum to insure the survival of the vinyl groups. A yellow-brown vinyl- and methyl-containing polysilane (54.8 g) was obtained which, by proton NMR, contained 2.5 weight percent vinyl. The polysilane contained 38.5 weight percent silicon, 36.1 weight percent carbon, 8.3 weight percent hydrogen, 1.3 weight percent oxygen, and 7.1 weight percent chlorine and had a softening temperature of 50° C. The molecular weights were 865 (number average) and 2106 (weight average).

Fibers with an average diameter of 39 microns were prepared by melt spinning the polysilane at 123° C. and a nitrogen pressure of 110 psi.

Fibers were cured by 350 nm irradiation for 2 hours in the presence of 1,3-butadiene (500 torr) using the procedure of Example 1. After curing the fibers were insoluble in toluene indicating that they had been rendered infusible.

EXAMPLE 9

A chlorine-containing polysilane was prepared by reacting a mixture of methylchlorodisilanes (436 g, about 2 moles), n-octyltrichlorosilane (24.8 g, 0.1 moles), and tetra-n-butylphosphonium bromide (4.4 g)

by heating from room temperature to 150° C. at 4° C./min, holding at 150° C. for 15 minutes, and heating from 150° to 280° C. at 5° C./min while removing volatile by-products. A vinyl Grignard reagent, (CH$_2$=CH)MgBr (0.1 moles, 1.0M solution in diethylether), was added dropwise to the chlorine-containing polysilane, dissolved in about 225 ml of toluene and cooled to 0° C., over a five minute period. The temperature was raised to 80° C. for 15 minutes and then lowered to room temperature. Then CH$_3$Li (0.30 moles, 1.7M in diethylether) was added dropwise over seven minutes. The temperature was raised to 100° C. and the diethylether removed by distillation. After cooling to room temperature, aqueous NH$_4$Cl was added. The organic layer was dried, filtered, and then the solvent was removed at 220° C. and 15 mm Hg. Treatment of the vinyl- and methyl-containing polysilane above about 200° C. was kept to a minimum to insure the survival of the vinyl groups. A yellow-brown vinyl- and methyl-containing polysilane (56.4 g) was obtained with molecular weights of 865 (number average) and 2106 (weight average).

Fibers were prepared by melt spinning the polysilane at 130° to 145° C. and a nitrogen pressure of 100 psi.

Fibers were cured by 350 nm irradiation for 17 hours in the presence of an oxygen and water mixture using the procedure of Example 2. After curing the fibers were insoluble in toluene. The cured fibers survived intact upon pyrolysis to 1200° C. at 3° C./min under an argon atmosphere; the resulting ceramic fibers (58.4 weight percent yield) contained 14.0 weight percent oxygen.

For comparison purposes, additonal fibers were treated with 254 nm irradiation for five hours in exactly the same manner except that there was no reactive gas present during the irradiation; the fibers were irradiated under high vacuum conditions. The resulting irradiated fibers were not rendered infusible; these fibers remained at least partially soluble in toluene and melted during pyrolysis to 1200° C. The resulting ceramic mass (53.3 weight percent yield) contained 4.4 weight percent oxygen.

EXAMPLE 10

A chlorine-containing polysilane was prepared by reacting a mixture of methylchlorodisilanes (580 g, about 2.7 moles), boron tribromide (39.5 g, 0.16 moles), and tetra-n-butylphosphonium bromide (59.7 g) by heating from room temperature to 270° C. at 2° C./min and holding at 270° C. for 3 hours while removing volatile by-products. The reaction mixture was cooled to room temperature and dissolved in 250 ml toluene. Then CH$_3$Li (0.88 moles, in diethylether) was added dropwise over 45 minutes during which time the temperature rose to about 60° C. The temperature was raised to 100° C. and the diethylether removed by distillation. After cooling to room temperature, aqueous NH$_4$Cl was added. The organic layer was dried, filtered, and then the solvent was removed at 150° C. and 1 mm Hg. A yellow-orange boron- and methyl radical-containing polysilane (99.3 g) was obtained which contained 31.8 weight percent silicon, 41.3 weight percent carbon, 9.6 weight percent hydrogen, 4.0 weight percent oxygen, and 5.0 weight percent chlorine. The polysilane had a softening temperature of 62° C. and molecular weights of 1272 (number average) and 1621 (weight average). The polysilane (48 g) was dissolved in toluene, filtered through a 0.1 micron membrane, and stripped at 275° C. and 25 mm Hg to give a final, light-brown boron- and methyl radical-containing polysilane (38.4 g) with 33.9 weight percent silicon, 38.0 weight percent carbon, 8.0 weight percent hydrogen, 4.0 weight percent oxygen, and 5.0 weight percent chlorine. The softening temperature of the restripped polysilane was 82° C.

Fibers were prepared by melt spinning the polysilane at 185° C. and a nitrogen pressure of 120 psi.

Fibers were cured by 350 nm irradiation for 15 hours in the presence of 1,3-butadiene (10.5 torr) using the procedure of Example 1. After curing the fibers were insoluble in toluene. The cured fibers survived intact upon pyrolysis to 1200° C. at 3° C./min under an argon atmosphere; the resulting ceramic fibers (49.3 weight percent yield) contained 16.9 weight percent oxygen.

Another set of fibers was cured by 350 nm irradiation for 16 hours in the presence of 1,3-butadiene (129 torr) using the procedure of Example 1. After curing the fibers were insoluble in toluene. The cured fibers survived intact upon pyrolysis to 1200° C. at 3° C./min under an argon atmosphere; the resulting ceramic fibers (53.0 weight percent yield) contained 10.6 weight percent oxygen. The ceramic fibers had a tensile strength of 8 Ksi and a modulus of 0.7 Msi.

EXAMPLE 11

A chlorine-containing polysilane was prepared by reacting a mixture of methylchlorodisilanes (436 g, about 2 moles), n-octyltrichlorosilane (24.8 g, 0.1 moles), phenyltrichlorosilane (21.2 g, 0.1 moles) and tetra-n-butylphosphonium bromide (4.9 g) by heating from room temperature to 90° C. at 5° C./min, 90° to 109° C. at 2° C./min, holding at 109° C. for 15 minutes, and 109° to 250° C. at 1.5° C./min while removing volatile by-products. The reaction mixture was cooled to room temperature at which time hexamethyldisilazane (262.5 g, 1.63 moles) and tetra-n-butylphosphonium bromide (1.0 g) was added. The reaction mixture was heated to 200° C. at 1.0° C./min while volatile by-products were removed by distillation. The residue was dissolved in toluene, filtered, and then stripped at 200° C. and 1.0 mm Hg. A yellow-brown (CH$_3$)$_3$SiNH-containing polysilane (84.9 g) was obtained which had a softening temperature of 92° C. and molecular weights of 836 (number average) and 1835 (weight average).

Fibers with an average diameter of 33 microns were prepared by melt spinning the polysilane at 197° C. and a nitrogen pressure of 110 psi.

Fibers were cured by 350 nm irradiation for 2 hours in the presence of 1,3-butadiene (500 torr) using the procedure of Example 1. After curing the fibers were insoluble in toluene. The cured fibers survived intact upon pyrolysis to 1200° C. at 3° C./min under an argon atmosphere; the resulting ceramic fibers (56.3 weight percent yield) contained 37.8 weight percent carbon, 6.8 weight percent nitrogen, and 3.7 weight percent oxygen.

EXAMPLE 12

A chlorine-containing polysilane was prepared by reacting a mixture of methylchlorodisilanes (439 g, about 2 moles), phenyltrichlorosilane (127 g, 0.6 moles) and tetra-n-butylphosphonium bromide (5.7 g) by heating from room temperature to 98° C. at 5° C./min, 98° to 117° C. at 2° C./min, holding at 117° C. for 22 minutes, and 117° to 250° C. at 1.5° C./min while removing volatile by-products. The reaction mixture was cooled to 110° C. at which time hexamethyldisilazane (280.6 g, 1.74 moles) was added. The reaction mixture was heated to 200° C. at 1.0° C./min while volatile by-products were removed by distillation. The residue was dissolved in toluene and then transferred to a pressure vessel where the vessel was pressurized to 90 psig with ammonia. After several hours the pressure was released and the toluene solution purged with argon for 1.5 hours. The reaction product was filtered and then stripped at 250° C. and 20 mm Hg. A yellow-brown $(CH_3)_3SiNH$-containing polysilane (91.5 g) was obtained which contained 35.6 weight percent silicon, 51.3 weight percent carbon, 6.6 weight percent hydrogen, 4.6 weight percent nitrogen, 1.4 weight percent oxygen, and 0.2 weight percent chlorine. The polysilane had a softening temperature of 135° C. and molecular weights of 608 (number average) and 989 (weight average).

Fibers with an average diameter of 48 microns were prepared by melt spinning the polysilane at 218° C. and a nitrogen pressure of 100 psi.

Fibers were cured by 350 nm irradiation for 2 hours in the presence of 1,3-butadiene (500 torr) using the procedure of Example 1. After curing the fibers were insoluble in toluene. The cured fibers survived intact upon pyrolysis to 1200° C. at 3° C./min under an argon atmosphere; the resulting ceramic fibers (56.8 weight percent yield) contained 48.8 weight percent carbon, 4.7 weight percent nitrogen, and 2.1 weight percent oxygen.

EXAMPLE 13

A chlorine-containing polysilane was prepared by reacting a mixture of methylchlorodisilanes (437 g, about 2 moles), n-octyltrichlorosilane (24.9 g, 0.1 moles) and tetra-n-butylphosphonium bromide (5.1 g) by heating from room temperature to 85° C. at 5° C./min, 85° to 106° C. at 2° C./min, holding at 106° C. for 15 minutes, and 106° to 250° C. at 1.5° C./min while removing volatile by-products. The reaction mixture was cooled to room temperature and dissolved in toluene (144 g) at which time hexamethyldisilazane (247.3 g, 1.54 moles) was added. The reaction mixture was heated to 200° C. at 1.0° C./min while volatile by-products were removed by distillation. The reaction product was dissolved in toluene, filtered, and then stripped at 220° C. and 20 mm Hg. A yellow-brown $(CH_3)_3SiNH$-containing polysilane (96.5 g) was obtained which contained 49.1 weight percent silicon, 31.6 weight percent carbon, 8.1 weight percent hydrogen, 6.4 weight percent nitrogen, 1.0 weight percent oxygen, and 2.5 weight percent chlorine. The polysilane had a softening temperature of 128° C.

Fibers were prepared by melt spinning the polysilane at 265° C. and a nitrogen pressure of 100 psi.

Fibers were cured by 350 nm irradiation for 17 hours in the presence of oxygen and moisture using the procedure of Example 2. After curing the fibers were insoluble in toluene. The cured fibers survived intact upon pyrolysis to 1200° C. at 3° C./min under an argon atmosphere; the resulting ceramic fibers (60.5 weight percent yield) contained 22.3 weight percent oxygen and had a tensile strength of 27 Ksi and a modulus of 4.3 Msi.

EXAMPLE 14

A yellow-brown $(CH_3)_3SiNH$-containing polysilane (79.9) was prepared using the almost identical procedure described in Example 13. The polysilane contained 47.4 weight percent silicon, 28.6 weight percent carbon, 7.0 weight percent hydrogen, 2.8 weight percent nitrogen, 2.9 weight percent oxygen, and 8.0 weight percent chlorine. The polysilane had a softening temperature of 150° C. and molecular weights of 1559 (number average) and 3197 (weight average).

Fibers with an average diameter of 38.8 microns were prepared by melt spinning the polysilane at 249° C. and a nitrogen pressure of 60 psi.

Fibers were cured by 300 nm irradiation for 17 hours in the presence of oxygen and moisture using the procedure of Example 2. After curing the fibers were insoluble in toluene. The cured fibers survived intact upon pyrolysis to 1200° C. at 3° C./min under an argon atmosphere; the resulting ceramic fibers (56.1 weight percent yield) contained 25.9 weight percent oxygen.

For comparison purposes, additional fibers were treated with 254 nm irradiation for two hours in exactly the same manner except that there was no reactive gas present during the irradiation; the fibers were irradiated under high vacuum conditions. The resulting irradiated fibers were not rendered infusible; these fibers remained at least partially soluble in toluene and melted during pyrolysis to 1200° C. The resulting ceramic mass (63.4 weight percent yield) contained 5.2 weight percent oxygen.

That which is claimed:

1. A method of rendering a preceramic polysilane infusible prior to pyrolysis, which method comprises ultraviolet irradiation of the preceramic polysilane in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane for a time sufficient to render the preceramic polysilane infusible.

2. A method as defined in claim 1 where the preceramic polysilane is of general formula

where there are present 0 to 40 mole percent $[R_2Si]$ units, 40 to 100 mole percent $[RSi]$ units, and 0 to 60 mole percent $[R'Si]$ units, where R is an alkyl radical containing 1 to 4 carbon atoms and R' is an alkyl radical containing at least 5 carbon atoms or a phenyl radical, and where the other bonds on silicon are attached to other silicon atoms and R'' radicals, R'''O— radicals, RO— radicals, or $R^{iv}_2N$— radicals, where R'' is an alkyl radical containing 1 to 20 carbon atoms, a vinyl radical, a phenyl radical, or an acetylenic radical of general formula $—(CH_2)_wC≡CR^{vi}$, R''' is an alkyl radical containing 1 to 4 carbon atoms or a phenyl radical, R is an alkyl radical containing 1 to 4 carbon atoms, $R^{iv}$ is hydrogen, an alkyl radical containing 1 to 4 carbon atoms, a phenyl radical or a $—SiR^v_3$ radical, $R^v$ is an alkyl radical containing 1 to 4 carbon atoms, a vinyl radical, or a phenyl radical, where w is an integer from 0 to 3, and where $R^{vi}$ is hydrogen, an alkyl radical containing 1 to 6 carbon atoms, a phenyl radical, or an $—SiR_3$ radical.

3. A method as defined in claim 2 where the polysilane contains from 0 to 40 mole percent $[R_2Si]$ units, 40 to 99 mole percent $[RSi]$ units, and 0 to 30 mole percent $[R''Si]$ units.

4. A method as defined in claim 3 where the polysilane contains from 0 to 10 mole percent $[R_2Si]$ units, 80 to 99 mole percent $[RSi]$ units, and 0 to 20 mole percent $[R''Si]$ units.

5. A method as defined in claim 3 where the reactive gas is selected from the group consisting of ethylene, 1,3-butadiene, 2-methyl-1,3-butadiene, and 1,4-pentadiene.

6. A method as defined in claim 5 where the reactive gas is 1,3-butadiene.

7. A method as defined in claim 5 where the reactive gas is ethylene.

8. A method as defined in claim 3 where the reactive gas is selected from the group consisting of silane, chlorosilane, dichlorosilane, and tetravinylsilane.

9. A method as defined in claim 3 where the reactive gas is a mixture of oxygen and moisture.

10. A method as defined in claim 3 where the reactive gas is acetylene.

11. A method as defined in claim 3 where the reactive gas is boron trichloride.

12. A method as defined in claim 3 where the other bonds on silicon are attached to other silicon atoms and $R''$ radicals.

13. A method as defined in claim 3 where the other bonds on silicon are attached to other silicon atoms and $R'''O-$ or $RO-$ radicals.

14. A method as defined in claim 3 where the other bonds on silicon are attached to other silicon atoms and $R^{iv}{}_2N-$ radicals.

15. A method of preparing a ceramic article, said method comprising (A) forming an article of the desired shape from a preceramic polysilane; (B) curing the article formed in step (A) by ultraviolet irradiation of the formed article in the presence of a reactive gas selected from the group consisting of ethylene, 1,3-butadiene, 2-methyl-1,3-butadiene, 1,4-pentadiene, silane, chlorosilane, dichlorosilane, boron trichloride, oxygen and water mixture, acetylene, and tetravinylsilane so that the formed article will not melt or fuse during pyrolysis step (C); and (C) heating the cured article of step (B) in an inert atmosphere or in a vacuum to an elevated temperature greater than 800° C. until the preceramic polysilane is converted to ceramic article.

16. A method as defined in claim 15 where the preceramic polysilane is of general formula

where there are present 0 to 40 mole percent [R$_2$Si] units, 40 to 100 mole percent [RSi] units, and 0 to 60 mole percent [R'Si] units, where R is an alkyl radical containing 1 to 4 carbon atoms and R' is an alkyl radical containing at least 5 carbon atoms or a phenyl radical, and where the other bonds on silicon are attached to other silicon atoms and $R''$ radicals, $R'''O$-radicals, $RO-$ radicals, or $R^{iv}{}_2N-$ radicals, where $R''$ is an alkyl radical containing 1 to 20 carbon atoms, a vinyl radical, a phenyl radical, or an acetylenic radical of general formula $-(CH_2)_wC{\equiv}CR^{vi}$, $R'''$ is an alkyl radical containing 1 to 4 carbon atoms or a phenyl radical, R is an alkyl radical containing 1 to 4 carbon atoms, $R^{iv}$ is hydrogen, an alkyl radical containing 1 to 4 carbon atoms, a phenyl radical or a $-SiR^v{}_3$ radical, $R^v$ is an alkyl radical containing 1 to 4 carbon atoms, a vinyl radical, or a phenyl radical, where w is an integer from 0 to 3, and where $R^{vi}$ is hydrogen, an alkyl radical containing 1 to 6 carbon atoms, a phenyl radical, or an $-SiR_3$ radical.

17. A method as defined in claim 16 where the polysilane contains from 0 to 40 mole percent [R$_2$Si] units, 40 to 99 mole percent [RSi] units, and 0 to 30 mole percent [R''Si] units.

18. A method as defined in claim 17 where the polysilane contains from 0 to 10 mole percent [R$_2$Si] units, 80 to 99 mole percent [RSi] units, and 0 to 20 mole percent [R''Si] units.

19. A method as defined in claim 17 where the reactive gas is selected from the group consisting of ethylene, 1,3-butadiene, 2-methyl-1,3butadiene, and 1,4-pentadiene.

20. A method as defined in claim 19 where the reactive gas is 1,3-butadiene.

21. A method as defined in claim 19 where the reactive gas is ethylene.

22. A method as defined in claim 19 where the surface of the ceramic article is carbon rich.

23. A method as defined in claim 20 where the surface of the ceramic article is carbon rich.

24. A method as defined in claim 21 where the surface of the ceramic article is carbon rich.

25. A method as defined in claim 17 where the reactive gas is selected from the group consisting of silane, chlorosilane, dichlorosilane, and tetravinylsilane.

26. A method as defined in claim 17 where the reactive gas is a mixture of oxygen and moisture.

27. A method as defined in claim 17 where the reactive gas is acetylene.

28. A method as defined in claim 17 where the reactive gas is boron trichloride.

29. A method as defined in claim 17 where the other bonds on silicon are attached to other silicon atoms and $R''$ radicals.

30. A method as defined in claim 17 where the other bonds on silicon are attached to other silicon atoms and $R'''O-$ or $RO-$ radicals.

31. A method as defined in claim 17 where the other bonds on silicon are attached to other silicon atoms and $R^{iv}{}_2N-$ radicals.

* * * * *